United States Patent
Belcher

[15] 3,685,461
[45] Aug. 22, 1972

[54] PALLET
[72] Inventor: Samuel L. Belcher, Springfield, Ohio
[73] Assignee: Owens-Illinois, Inc.
[22] Filed: Oct. 30, 1970
[21] Appl. No.: 85,511

[52] U.S. Cl. ................................................. 108/51
[51] Int. Cl. ........................................... B65d 19/18
[58] Field of Search ..................... 108/51–58, 158, 108/156–161

[56] References Cited

UNITED STATES PATENTS

| | | | |
|---|---|---|---|
| 3,563,183 | 2/1971 | Rich | 108/51 |
| 3,438,342 | 4/1965 | Woolworth et al. | 108/51 |
| 3,187,689 | 6/1965 | Hess | 108/58 |
| 331,212 | 11/1885 | Pleukharp | 108/158 |
| 2,783,960 | 3/1957 | Herz et al. | 108/56 |
| 2,930,560 | 3/1960 | Carnwath et al. | 108/56 |
| 2,981,578 | 4/1961 | Saarinen | 108/158 X |

*Primary Examiner*—Bobby R. Gay
*Assistant Examiner*—Glenn O. Finch
*Attorney*—E. F. Dwyer and E. J. Holler

[57] ABSTRACT

A pallet having a top platform formed by an internal stiffening member covered with a high-density plastic sheet, a base, a plurality of supporting columns holding the platform in a spaced relationship with the base, and means for holding the platform to the base.

2 Claims, 4 Drawing Figures

PATENTED AUG 22 1972 3,685,461

INVENTOR.
SAMUEL L. BELCHER
BY E.F. Dwyer &
E.J. Holler

ATTORNEYS

PATENTED AUG 22 1972 3,685,461

INVENTOR.
SAMUEL L. BELCHER.
BY
E.F. DWYER & E.J. HOLLER.
ATT'YS.

3,685,461

PALLET

BACKGROUND OF THE INVENTION

1. Field of the Invention

Pallets which are moisture-proof, easily-cleaned, and light in weight are most desireable for transporting and storage operations in the food processing industry.

Pallets which are resistant to deterioration under attack by the elements, including microorganisms, are especially desireable when the pallet is subjected to extreme uses such as outdoor storage. This invention provides a light-weight, easily cleaned, moisture-proof pallet with a flat, snag-free base for easy rolling on conveyors.

2. Description of the Prior Art

Plastic pallets in the prior art include U.S. Pat. No. 3,467,032 and U.S. Pat. No. 3,404,642. These pallets are made from a formed, plastic material, using pieces of high-density plastic which are joined at points to provide openings for the lifts of a fork lift.

Other pallets of the prior art provided a strong, light-weight pallet but were not snag-free and not particularly appropriate for conveyor operations. The pallet of this invention does provide a moisture-proof, smooth-bottomed light-weight pallet of excellent strength.

SUMMARY OF THE INVENTION

This invention is a pallet having a top platform, base, and supporting columns maintaining the platform in a spaced relationship with the base, and providing entry for the forks of a lift. The platform is constructed of an internal stiffening member, covered with a high-density polyethylene plastic. The supporting columns are formed into the base. Means for fastening the platform to the base are inserted into holes over the area of the platform, extending through to the base. Some of the supporting columns are placed in proximity to the edge of the top platform, allowing a minor portion of the total dimension of the platform to overhang the column.

The configuration of platform and base provides a pallet which has great strength in supporting heavy loads in a static position, when the base is entirely supported.

Also, the configuration of the pallet provides a very strong support when the pallet is rack-loaded, that is, supported only near its ends.

The combination of the platform and ribs with the base forms a reinforced pallet structure, and the high-density polyethylene plastic covering of the stiffener forms a moisture-proof, water-proof barrier.

DESCRIPTION OF THE PREFERRED EMBODIMENTS

Figure 2:
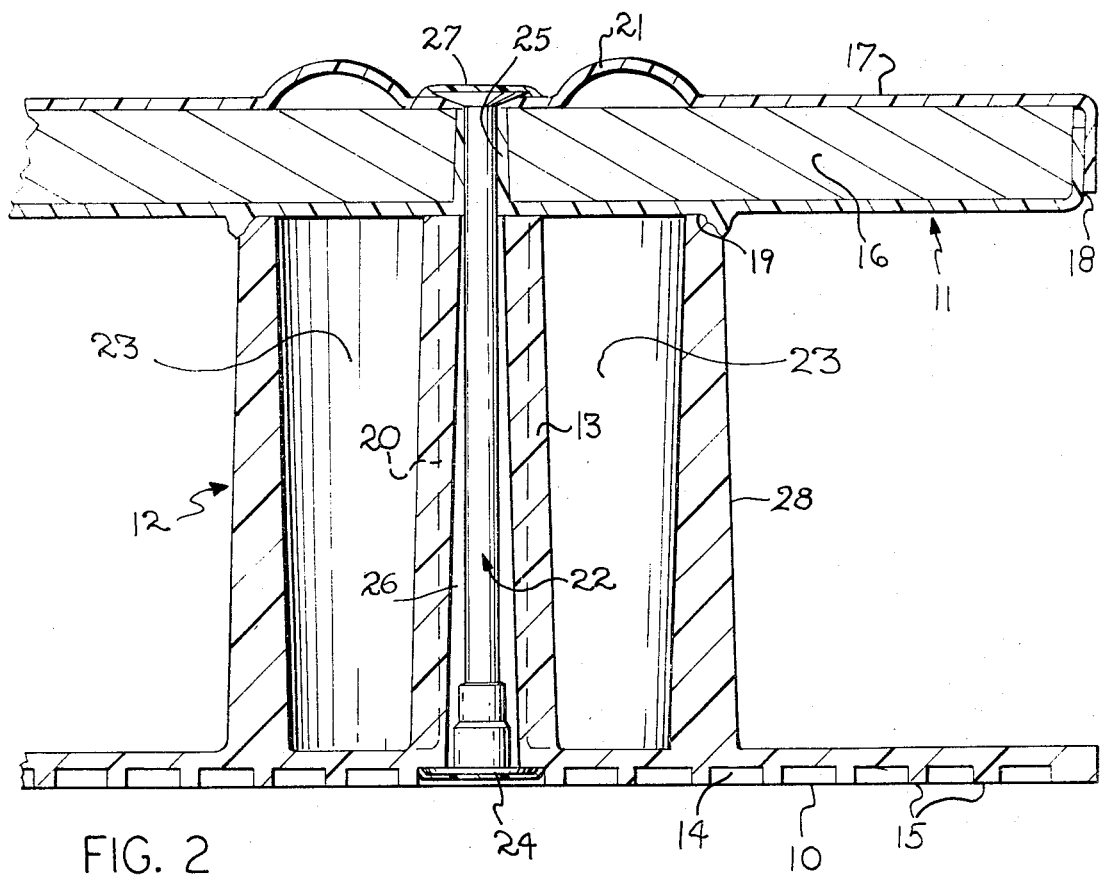
FIG. 2 is an enlarged, partial cross-section view of the pallet of FIG. 1.

The pallet of this invention comprises a base 10, a platform 11, and a plurality of supporting columns 12. Each supporting column comprises a pair of ribs 13 and 25. The base 10 has a plurality of indentions 14 and a plurality of ridges 15.

The supporting columns can be formed integrally with the base and may be of varying heights, depending upon the requirements of the forks of a lift truck. The top platform 11 has an internal stiffening member 16. The stiffener may be hardwood, plywood or a steel. The stiffening member 16 is completely enclosed with a high-density plastic 17. The stiffener is pierced with holes 25, prior to the covering with plastic sheets. The plastic enclosure for the stiffener, including the area within the holes, provides a water-tight enclosure. The polyethylene sheet is overlapped and forms a waterproof joint 18. The bottom surface of the sheet covering the platform may have circular projections 19 which meet with the outermost rib of the supporting column. The inner rib of the column has a flat surface on the top. The inner rib 13 and outer ribs are connected by a vertical web 20.

The bottom platform has a plurality of indentations 14 running longitudinally across one dimension of the bottom. These provide a flat surface but having a reduced friction when sliding over a floor, on a roller conveyor.

Figure 1:
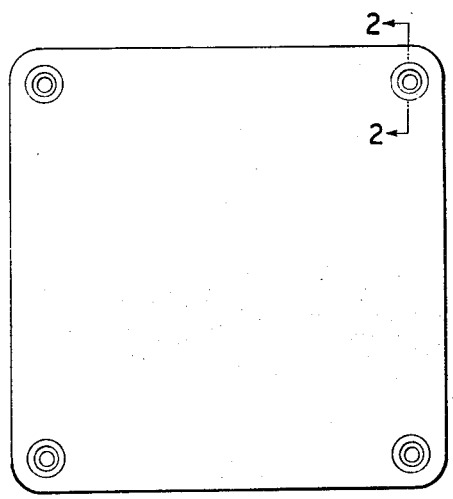
FIG. 1 is a top view of the pallet of this invention.
Figure 3:
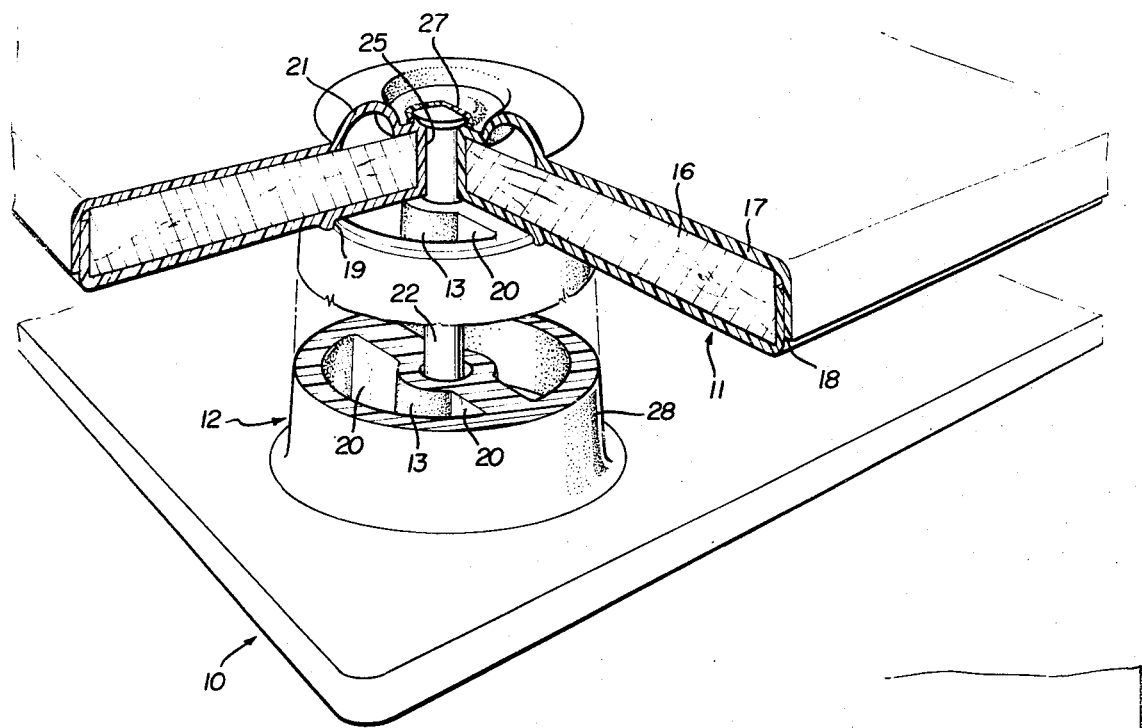
FIG. 3 shows a support column from a side view.
Figure 4:
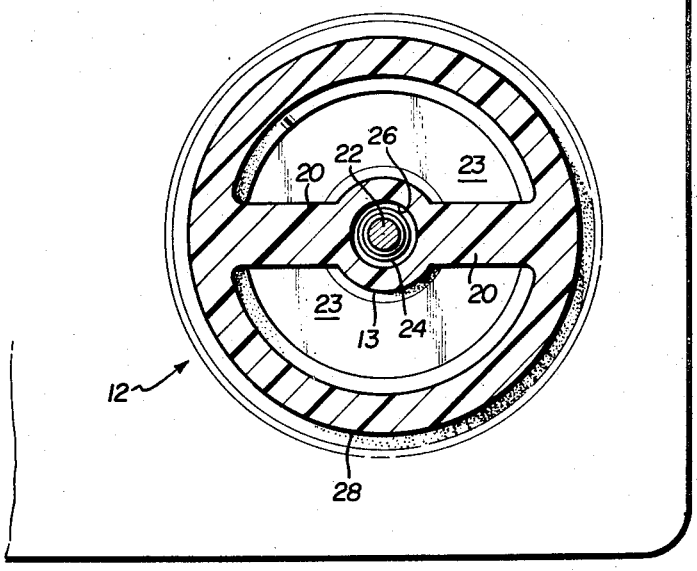
FIG. 4 is a cross-section of the column of FIG. 3 from the top.

In the cross-section of FIG. 2, a typical fastening area shows a portion of the polyethylene sheet which is raised, and the center of the raised area is flattened. This design provides protection for the fastening means. The surface of raised area 21, as indicated in FIG. 2, acts as a contact surface for any material which may be placed upon the pallet. This plurality of raised contact areas provides a smooth, snag-free surface for facilitating the movement of goods or materials across the surface of the pallet. FIG. 3 shows a supporting column of the pallet of FIG. 1 from a side view. FIG. 4 is a cross-section of the column of FIG. 3, taken from the top. The supporting column 12 has an inner rib 13 and an outer rib 28. The inner and outer ribs are connected by vertical web 20. The inner and outer ribs and web 20 define a space 23, as shown in FIGS. 2, 3 and 4.

A supporting column is formed as a hollow cylinder, with a taper in some embodiments, with a larger concentric wall cylinder encircling the first cylinder and forming a space between the cylinders. This space 23 may be filled with a reinforcing material such as a formed, hardened plastic, if desired, for additional strength. The inner and outer cylinders are joined by a vertically-extending web 20 which serves to reinforce the cylinder walls, the walls and web forming a column.

When the fastening member is inserted into the conduit 26 of a column and is in position within the pallet, the top of the fastener is sealed with a hot melt adhesive 27 or other waterproofing material. The bottom opening in the base for the fastening means is also sealed.

A typical fastening device 22 is a bolt, having a large, flat, tapered head and a flat, internally-threaded bolt 24. When the fastening device and the bolt are completely assembled, there are no projections above the surface of either the base or the top platform. The top of the fastening device in one preferred embodiment is protected by a raised 21 portion in the plastic cover. This raised portion forms a projecting, protection area for the bolt. When goods are placed upon the platform, the projections form an elevated, snag-free path for sliding on and off the pallet.

What is claimed is:

1. A pallet comprising a base, a platform and a plurality of columns formed integrally with the base and holding the platform in a spaced relationship with the base, said columns comprising:
   a. a first cylinder having a hollow passage;
   b. a second larger, concentric cylinder enclosing the first cylinder;
   c. said first and second cylinders joined by a vertically extending web, reinforcing the cylinders and forming a space between the cylinders;
   d. the bottom surface of the platform having circular projections which meet the outer cylinder of each supporting column about its outer surface, forming a water-tight seal between the columns and the platform; and
   e. reinforcing material in the space between the inner and outer cylinders.

2. The pallet of claim 1 wherein a hot melt adhesive seals the platform end of the hollow passage of the first cylinder.

* * * * *